(12) United States Patent  (10) Patent No.: US 7,434,975 B2
Lin et al.  (45) Date of Patent: Oct. 14, 2008

(54) BACKLIGHT MODULE WITH BRIGHTNESS ENHANCING STRUCTURES AND LIQUID CRYSTAL DISPLAY DEVICE INCORPORATING SAME

(75) Inventors: Yu-Cheng Lin, Miao-Li (TW); Brian (Xi-Yu) Guo, Miao-Li (TW); Chiu-Lien Yang, Miao-Li (TW); Chia-Lung Lin, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 190 days.

(21) Appl. No.: 11/409,820

(22) Filed: Apr. 24, 2006

(65) Prior Publication Data

US 2006/0239031 A1 Oct. 26, 2006

(30) Foreign Application Priority Data

Apr. 22, 2005 (TW) .............................. 94206390 U

(51) Int. Cl.
F21V 7/04 (2006.01)

(52) U.S. Cl. ..................... 362/619; 362/620; 362/331

(58) Field of Classification Search ................. 362/603, 362/609, 626, 331, 561, 97; 349/63, 65
See application file for complete search history.

(56) References Cited

U.S. PATENT DOCUMENTS

2001/0053075 A1* 12/2001 Parker et al. ................... 362/31
2003/0210539 A1* 11/2003 Park et al. ...................... 362/31

FOREIGN PATENT DOCUMENTS

JP 2001143512 * 5/2001
JP 2002109928 * 4/2002

* cited by examiner

*Primary Examiner*—Ali Alavi
(74) *Attorney, Agent, or Firm*—Wei Te Chung

(57) ABSTRACT

A liquid crystal display device 700 has a liquid crystal panel 701 and a backlight module 70 under the liquid crystal panel for providing light beams to the liquid crystal panel. The backlight module includes at least one light source 720, and a light guide plate 711. The light guide plate has an incident surface 710 for receiving light beams from the at least one light source, an emitting surface 712 adjacent the incident surface, and a bottom surface 713 opposite to the emitting surface, at least one brightness enhancing pattern being provided at the bottom surface. The at least one brightness enhancing pattern has a plurality of brightness enhancing element 714, each of which is an arcuate and generally subtending the at least one light source.

15 Claims, 4 Drawing Sheets

BACKLIGHT MODULE WITH BRIGHTNESS ENHANCING STRUCTURES AND LIQUID CRYSTAL DISPLAY DEVICE INCORPORATING SAME

BACKGROUND OF THE INVENTION

1. Field of the Invention

The present invention relates to a backlight module employed in a liquid crystal display device, and particularly to a backlight module having brightness enhancing structures configured for high and uniform brightness.

2. Description of Related Art

Because a liquid crystal display (LCD) device has the merits of being thin, light in weight, and drivable by a low voltage, it is extensively employed in various electronic devices.

A liquid crystal panel of an LCD device cannot itself emit light beams. Therefore a typical liquid crystal panel uses a backlight module to provide the needed illumination. The backlight module has a light source and a light guide plate. The light source emits the light beams to the light guide plate, which then transmits the light beams to illuminate the liquid crystal panel.

The light source may be a linear light source, or one or more point light sources. The light guide plate has an end face through which light is introduced, and two opposite major faces one of which functions as an emission face. The performance of the surface light source greatly depends on the characteristics of the light guide plate employed therein.

A light guide plate functions to change a direction of propagation of light beams emitted from the light source and introduced into the light guide plate, from a direction roughly parallel to the emission face of the light guide plate to a direction perpendicular to the emission face. That is, the light guide plate effectively changes the linear or point light source(s) into a surface light source, for evenly illuminating a whole display screen of the liquid crystal panel.

FIG. 10 shows a conventional backlight system 100, which has a light guide plate 103, a linear light source 101 adjacent the light guide plate 103, a reflector 104, and a brightness enhancing film 105 having a plurality of V-shaped prisms 1051. The reflector 104, the light guide plate 103 and the brightness enhancing film 105 are stacked in that order from bottom to top. The light guide plate 103 has a uniform thickness, and comprises an incident surface 1031, an emitting surface 1033, and a bottom surface 1032 opposite to the emitting surface 1033. A plurality of scattering dots 1034 is formed on the bottom surface 1032. The linear light source 101 is covered by a light source cover 102 on three sides thereof, for reflecting light beams into the light guide plate 103. The linear light source 101 is positioned adjacent the incident surface 1031 of the light guide plate 103, and emits light beams into the light guide plate 103 through the incident surface 1031. A proportion of the light beams thus introduced into the light guide plate 103 are reflected to the brightness enhancing film 105 by the bottom surface 1032. The brightness enhancing film 105 converges the light beams and introduces the converged light beams into an LCD (not shown). The backlight system 100 employs a plurality of optical elements and has a plurality of optical interfaces. The various optical interfaces cumulatively contribute to an unduly high loss of light intensity in the backlight system 100. That is, the backlight system 100 does not attain very effective optical utilization. Moreover, the brightness enhancing film 105 is generally expensive, and inflates the cost of the backlight system 100 proportionately.

It is desired to provide a new light guide plate and a corresponding backlight module which overcome the above-described problems.

SUMMARY

A backlight module includes a light source and a light guide plate. The light guide plate has an incident surface for receiving light beams from the at least one light source, an emitting surface adjoining the incident surface, and a bottom surface opposite to the emitting surface, at least one brightness enhancing pattern being defined at the bottom surface. The at least one brightness enhancing pattern has a plurality of brightness enhancing elements, each of which is an arcuate configure and generally subtending the at least one light source.

A liquid crystal display device includes a liquid crystal panel and a backlight module under the liquid crystal panel for providing light beams to the liquid crystal panel. The backlight module includes at least one light source, and a light guide plate. The light guide plate includes an incident surface for receiving light beams from the at least one light source, an emitting surface adjoining the incident surface, and a bottom surface opposite to the emitting surface, at least one brightness enhancing pattern being defined at the bottom surface. The at least one brightness enhancing pattern has a plurality of brightness enhancing elements, each of which is an arcuate configure and generally subtending the at least one light source.

Other advantages and novel features will become more apparent from the following detailed description when taken in conjunction with the accompanying drawings, in which

DETAILED DESCRIPTION OF THE EMBODIMENTS

Figure 1:
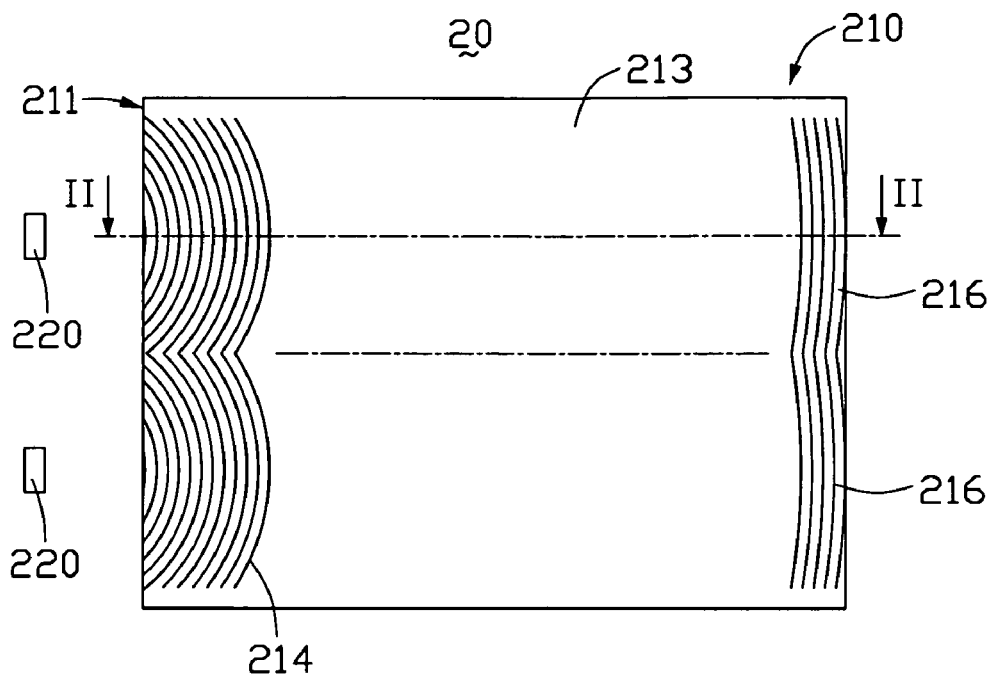
FIG. 1 is a schematic, simplified, bottom plan view of a backlight module according to a first embodiment of the present invention, the backlight module including a light guide plate.
Figure 2:
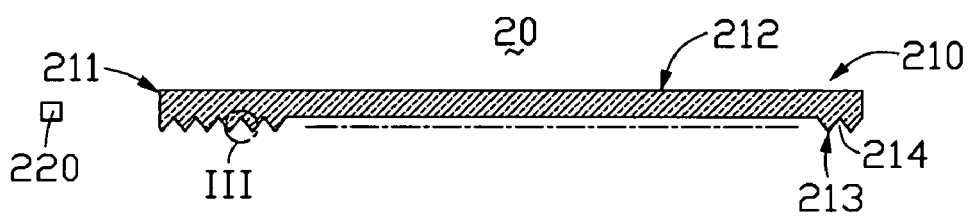
FIG. 2 is a cross-sectional view taken along line II-II of FIG. 1.
Figure 3:
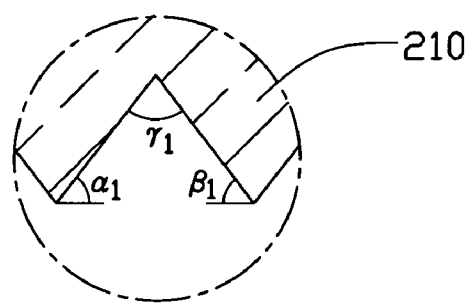
FIG. 3 is an enlarged view of a circled portion III of FIG. 2, showing part of a brightness enhancing structure of the light guide plate.

Referring to FIGS. 1-3, a backlight module 20 according to the first embodiment of the present invention is shown. The backlight module 20 includes a light guide plate 210 and two light sources 220. The light sources 220 provide light beams to the light guide plate 210. The light guide plate 210 changes the directions of transmission of the light beams from the light sources 220 to a uniformly parallel transmission direction such that the backlight module 20 functions as a surface light source. The light guide plate 210 includes an incident surface 211, a bottom surface 213, and an emitting surface 212. The incident surface 211 adjoins the bottom surface 213 and the emitting surface 212. The emitting surface 212 is opposite to the bottom surface 213. The bottom surface 213 has a brightness enhancing pattern 216. The brightness enhancing pattern 216 includes a plurality of V-shaped grooves 214. Each V-shaped groove 214 is formed as a so-called string, whereby two arcuate portions are connected end-to-end, with the two arcuate portions being symmetrical to each other. Each arcuate portion generally subtends a respective one of the light sources 220. The V-shaped grooves 214 are arranged generally parallel to each other. However, curvatures of generally parallel arcuate portions progressively decrease in a direction away from the corresponding light source 220.

Referring to FIG. 3, part of a V-shaped groove 214 according to the first embodiment is shown. Each V-shaped groove 214 defines a triangular cross-section, which defines an apex angle $\gamma_1$, a base angle $\alpha_1$ nearest to the incident surface 211, and a base angle $\beta_1$ farthest away from the incident surface 211. Preferably, the apex angler $\gamma_1$ seventy-five degrees (75°), and the base angle $\alpha_1$ is smaller than the base angles $\beta_1$.

The backlight module 20 utilizes each light source 220 being positioned at a point whereby the corresponding generally parallel arcuate portions of the V-shaped grooves 214 generally subtend the light source 220. Thus, by configuring the curvature of each of the arcuate portions of the V-shaped grooves 214 according to the radiation angle of the light source 220, the backlight module 20 can efficiently control the light beams from the light sources 220 to be guided to a predetermined viewing angle region of an associated liquid crystal panel (not shown) that is positioned adjacent the emitting surface 213 of the light guide plate 210. Therefore the backlight module 20 does not need a brightness enhancement film to adjust the directions of the light beams emitted out from the emitting surface 213 of the light guide plate 210. The omission of the brightness enhancement film and its associated interfaces enhances the efficiency of utilization of the light beams, and lowers the cost of the backlight module 20.

Figure 4:
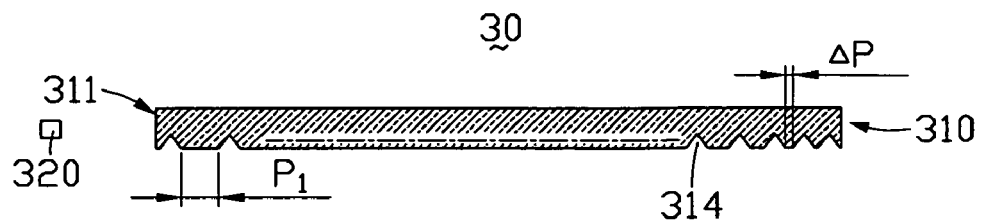
FIG. 4 is a schematic, simplified, side cross-sectional view of a backlight module according to a second embodiment of the present invention.

Referring to FIG. 4, a backlight module according to a second embodiment of the present invention is shown. The backlight module 30 has a structure similar to that of the backlight module 20. However, the backlight module 30 includes a light guide plate 310, and two light sources 320 for providing light beams to the light guide plate 310. A density of V-shaped grooves 314 progressively increases in a direction away from an incident surface 311. The density distribution is calculated according to the following formula:

$$\Delta p = p_1 \times \tan^2[(n-1)/w \times \pi/4]$$

wherein $\Delta p$ is a distance separating any two adjacent V-shaped grooves 314, $p_1$ is a distance separating the two adjacent V-shaped grooves 314 nearest to the incident surface 311, n is the sequence number of the V-shaped groove 314 in each pair of adjacent V-shaped grooves 314 that is nearest to the incident surface 311 (with the sequencing beginning with the V-shaped groove 314 nearest to the incident surface 311), and w is a constant in the range from 50-500. In this way, the intensity of light within the light guide plate 310 progressively decreases in a direction away from the incident surface 311, while the density of the V-shaped grooves 314 progressively increase in a direction away from the incident surface 311. The reflectivity of the V-shaped grooves 314 progressively increases in the same direction. Thus, the light guide plate 310 can provide uniform luminance.

Figure 5:
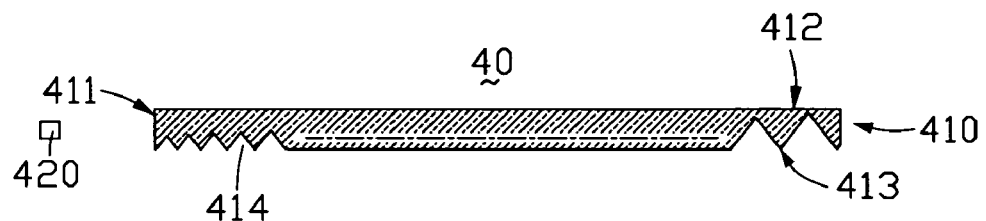
FIG. 5 is a schematic, simplified, side cross-sectional view of a backlight module according to a third embodiment of the present invention.

Referring to FIG. 5, a backlight module according to a third embodiment of the present invention is shown. The backlight module 40 has a structure similar to that of the backlight module 20. However, the backlight module 40 includes a light guide plate 410, and two light sources 420 for providing light beams to the light guide plate 410. The light guide plate 410 has an incident surface 411, an emitting surface 412, and a plurality of V-shaped grooves 414 defined at a bottom surface 413. Heights of the V-shaped grooves 414 progressively increase in a direction away from the incident surface 411. The heights of the V-shaped grooves 414 are in the range of 2-30 micrometers. The V-shaped grooves 414 with a great height can improve the reflectivity of light beams arriving thereat. Thus, the backlight module 40 can enhance uniformity of luminance of the whole emitting surface 412. In addition, the V-shaped grooves 414 with a great height can help prevent light beams from leaking from a side surface of the light guide plate 410 that is opposite to the incident surface 411. Therefore, the backlight module 40 can improve the efficiency of utilization of the light beams.

Figure 6:
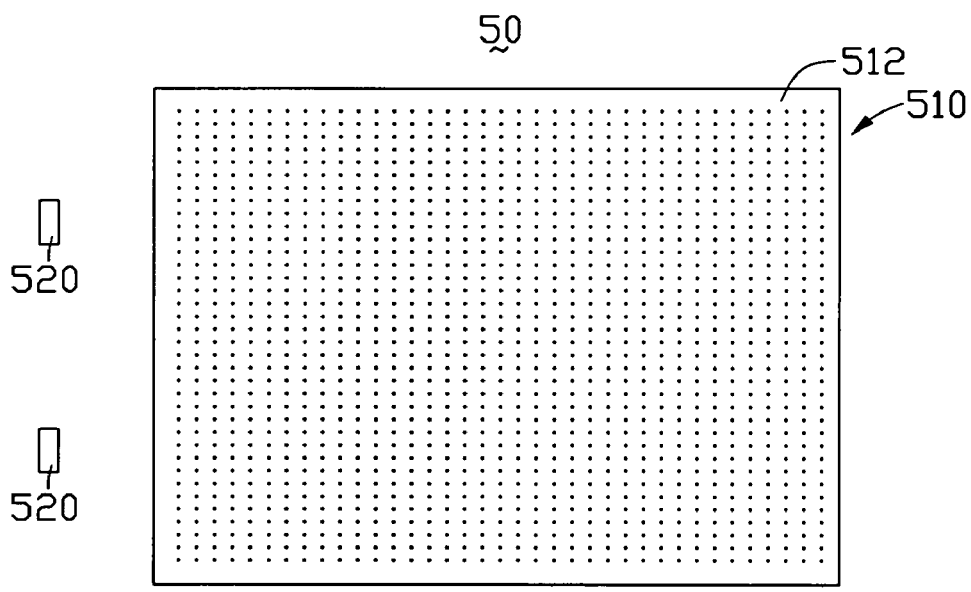
FIG. 6 is a schematic, top plan view of a backlight module according to a fourth embodiment of the present invention.

FIG. 6 shows a top plan view of a backlight module according to a fourth embodiment of the present invention. The backlight module 50 has a structure similar to that of the backlight module 20. However, the backlight module 50 includes a light guide plate 510, and two light sources 520 for providing light beams to the light guide plate 510. An emitting surface 512 of the light guide plate 510 is a roughened surface to diffuse light beams passing therethrough. Thus, the backlight module 50 does not need a diffuser plate, while still attaining uniform luminance of the whole emitting surface 512.

Figure 7:
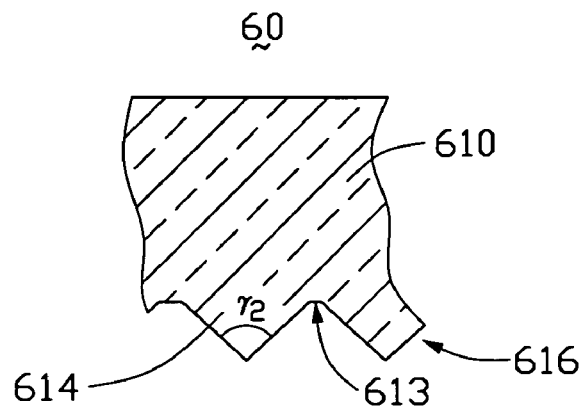
FIG. 7 is a schematic, enlarged, side cross-sectional view of part of a light guide plate for a backlight module according to a fifth embodiment of the present invention.

Referring to FIG. 7, part of a light guide plate for a backlight module according to the fifth embodiment of the present invention is shown. The backlight module 60 has a structure similar to that of the backlight module 20. However, the backlight module 60 includes a light guide plate 610 and two light sources (not shown) for providing light beams to the light guide plate 610. A brightness enhancing pattern 616 is provided at a bottom surface 613 of the light guide plate 610. The brightness enhancing pattern 616 includes a plurality of V-shaped prisms 614, which protrude outward from the bottom surface 613. Each prism 614 defines an apex angle $\gamma_2$, which is preferably ninety-five degrees (95°).

Figure 8:
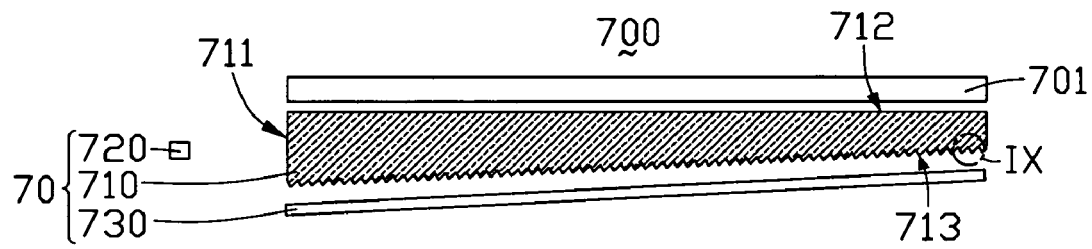
FIG. 8 is a schematic, side cross-sectional view of a liquid crystal display device according to a sixth embodiment of the present invention.
Figure 9:
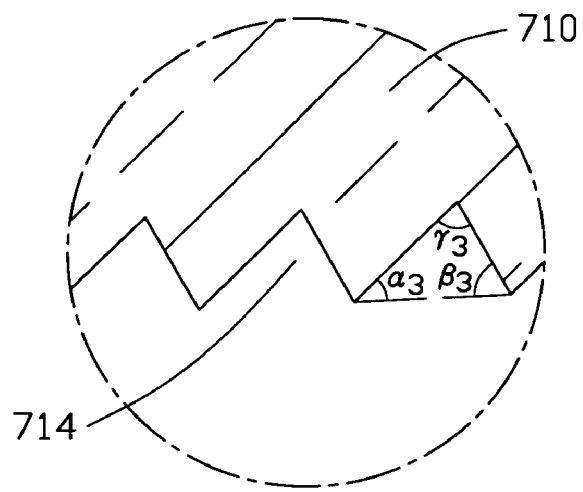
FIG. 9 is an enlarged view of a circled portion IX of FIG. 8.
Figure 10:
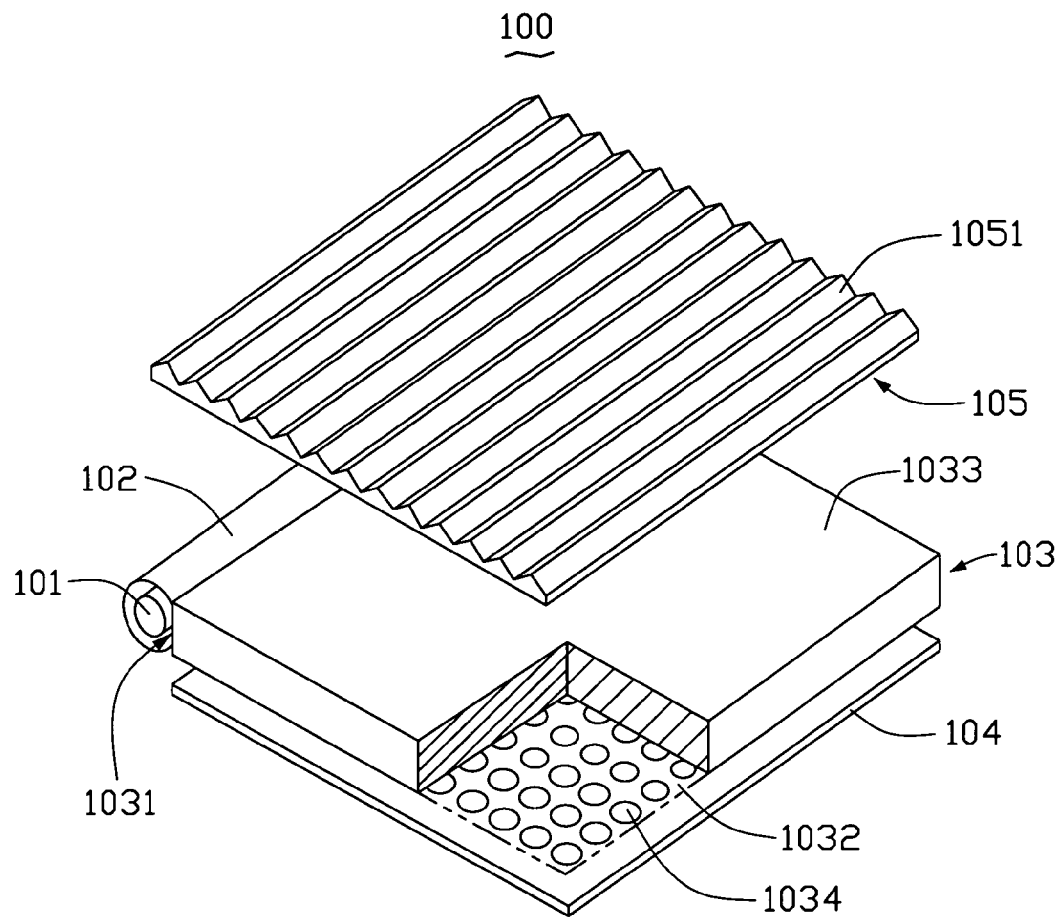
FIG. 10 is an exploded, isometric, cut-away view of a conventional backlight system.

Referring to FIGS. 8 and 9, an LCD device according to a sixth embodiment of the present invention is shown. The LCD device 700 has a liquid crystal panel 701, and a backlight module 70 under the liquid crystal panel 701. The backlight module 70 has a wedge-shaped light guide plate 710, two light sources 720 at one side of the light guide plate 710 for providing light beams to the light guide plate 710, and a reflector 730 under the light guide plate 710 for reflecting light beams into the light guide plate 710. The light guide plate 710 has an incident surface 711 introducing light beams from the light source 720 into the light guide plate 710, an emitting surface 712 adjoining the incident surface 711, and a bottom surface 713 opposite to the emitting surface 712. The bottom surface 713 has a brightness enhancing pattern (not shown). The brightness enhancing pattern includes a plurality of V-shaped grooves 714. Each V-shaped groove 714 is formed as a so-called string, whereby two arcuate portions being connected end-to-end, with the two arcuate portions being symmetrical to each other. Each arcuate portion generally subtends a respective one of the light sources 720. The V-shaped grooves 214 are arranged generally parallel to each other. However, curvatures of generally parallel arcuate portions progressively decrease in a direction away from the corresponding light source 720. Each V-shaped groove 714 defines a triangular cross-section, which defines an apex angle $\gamma_3$, a base angle $\alpha_3$ nearest to the incident surface 711, and a base angle $\beta_3$ farthest away from the incident surface 711. Preferably, the base angle $\alpha_3$ is smaller than the base angle $\beta_3$.

The backlight module 70 utilizes each light source 720 being positioned at a point whereby the corresponding generally parallel arcuate portions of the V-shaped grooves 714 generally subtend the light source 720. Thus, by configuring the curvature of each of the arcuate portions of the V-shaped grooves 714 according to the radiation angle of the light source 720, the backlight module 70 can efficiently control the light beams from the light sources 720 to be guided to a predetermined viewing angle region of the liquid crystal panel 701 that is positioned adjacent the emitting surface 713 of the light guide plate 710. Therefore the backlight module 70 does not need a brightness enhancement film to adjust the directions of the light beams emitted out from the emitting surface 713 of the light guide plate 710. The omission of the brightness enhancement film and its associated interfaces enhances the efficiency of utilization of the light beams, and lowers the cost of the backlight module 70.

It is to be further understood that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A backlight module, comprising:
   two light source; and
   a light guide plate comprising an incident surface for receiving light beams from the at least one light source, an emitting surface adjacent the incident surface, and a bottom surface opposite to the emitting surface, at least one brightness enhancing pattern being provided at being provided at the bottom surface;
   wherein the at least one brightness enhancing pattern comprises two parts, each of the parts of the at least one brightness enhancing pattern generally subtends a respective one of the light sources, each of the parts of the at least one brightness enhancing pattern has a plurality of brightness enhancing element, and each brightness enhancing element is arcuate and generally subtends the respective light source.

2. The backlight module as claimed in claim 1, wherein each of the brightness enhancing elements comprises a V-shaped groove, and each of the V-shaped grooves defines an apex angle of approximately 75 degrees.

3. The backlight module as claimed in claim 1, wherein each of the brightness enhancing elements comprises a prism structure, and the prism structures protrude from the bottom surface of the light guide plate.

4. The backlight module as claimed in claim 3, wherein each of the prism structures defines an apex angle of approximately 95 degrees.

5. The backlight module as claimed in claim 1, wherein in each of the parts of the at one brightness enhancing pattern, the brightness enhancing elements are generally parallel to each other and generally spaced apart uniformly.

6. The backlight module as claimed in claim 1, wherein in each of the parts of the at least one brightness enhancing pattern, a density of the brightness enhancing elements progressively increases in a direction away from the incident surface according to the formula:

$$\Delta p = p_i \times \tan_2[(n-1)/w \times \pi/4]$$

wherein $\Delta p$ is a pitch between two adjacent brightness enhancing elements $p_1$ is a distance between two adjacent brightness enhancing elements most adjacent to the incident surface, n is the number of the brightness enhancing elements numbering from the brightness enhancing elements most adjacent to the incident surface, and w is a constant in a range of 50-500.

7. The backlight module as claimed in claim 1, wherein each of the brightness enhancing elements defines a height, and in each of the parts of the at least one brightness enhancing pattern, the height of the brightness enhancing elements progressively increase in a direction away from the incident surface.

8. The backlight module as claimed in claim 1, wherein each of the brightness enhancing elements comprises a V-shaped groove, and each of the V-shaped grooves defines an apex angle with two side angles which are different from one another.

9. A liquid crystal display devise, comprising:
   at least one liquid crystal panel; and
   a backlight module under the liquid crystal panel for providing light beams to the liquid crystal panel, the backlight module comprising:
   two light sources; and
   a light guide plate comprising an incident surface for receiving light beams from the light sources, an emitting surface adjacent the incident surface, and a bottom surface opposite to the emitting surface, at least one brightness enhancing pattern being provided at the bottom surface;
   wherein the at least one brightness enhancing pattern comprises two parts, each of the at least one brightness enhancing pattern generally subtends a respective one of the light sources, each of the parts of the at least one brightness enhancing pattern has a plurality of brightness enhancing elements, and each brightness enhancing element is arcuate and generally subtends the respective light source.

10. The liquid crystal display device as claimed in claim 9, wherein each of the brightness enhancing elements comprises a V-shaped groove, and each of the V-shaped grooves defines an apex angle of approximately 75 degrees.

11. The backlight module as claimed in claim 9, wherein each of the brightness enhancing elements comprises a prism structure, and the prism structures protrude from the bottom surface of the light guide plate.

12. The liquid crystal display device as claimed in claim 11, wherein each of the prism structures defines an apex angle of approximately 95 degrees.

13. The liquid crystal display device as claimed in claim 9, wherein each of the parts of the at least one brightness enhancing pattern, the brightness enhancing elements are genereally parallel to each other and generally spaced apart uniformly.

14. The liquid crystal display device as claimed in claim 9, wherein each of the brightness enhancing element defines a height, and in each of the parts of the at least one brightness enhancing pattern, the heights of the brightness enhancing elements progressively icrease in a direction away from the incident surface.

15. A liquid crystal display device, comprising:

at least one liquid crystal panel; and a backlight module under the liquid crystal panel for providing light beam to the liquid crystal panel, the backlight module comprising:

at least one light source; and a light guide plate comprising an incident surface for receiving light beams from the at least one light source, an emitting surface adjacent the incident surface, and a bottom surface opposite to the emitting surface, at least one brightness enhancing pattern being provided at the bottom surface;

wherein the at least one brightness enhancing pattern has a plurality of brightness enhancing elements, each brightness enhancing element being arcuate and generally subtending the at least one source, and a density of the brightness enhancing elements progressively increases in a direction away from the incident surface according to the formula:

$$\Delta p = p_1 \times \tan^2[(n-1)/w \times \pi/4]$$

wherein $\Delta p$ is a pitch between two adjacent brightness enhancing elements $p_1$ is a distance between two adjacent brightness enhancing elements most adjacent to the incident surface, n is the number of the brightness enhancing elements numbering from the brightness enhancing elements most adjacent to the incident surface, and w is a constant in a range of 50-500.

* * * * *